United States Patent
Yang et al.

(10) Patent No.: US 9,467,041 B2
(45) Date of Patent: Oct. 11, 2016

(54) DIGITAL CURRENT EQUALIZING DEVICE, ANALOG CURRENT EQUALIZING DEVICE, CURRENT EQUALIZING METHOD AND SYSTEM

(71) Applicant: ZTE Corporation, Shenzhen, Guangdong (CN)

(72) Inventors: Yundong Yang, Shenzhen (CN); Dacheng Zheng, Shenzhen (CN); Qiong Wu, Shenzhen (CN); Jingsi Wang, Shenzhen (CN); Zhirong Cheng, Shenzhen (CN); Hong Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 100 days.

(21) Appl. No.: 14/404,971

(22) PCT Filed: Jun. 21, 2013

(86) PCT No.: PCT/CN2013/077719
§ 371 (c)(1),
(2) Date: Dec. 2, 2014

(87) PCT Pub. No.: WO2013/167003
PCT Pub. Date: Nov. 14, 2013

(65) Prior Publication Data
US 2015/0130426 A1    May 14, 2015

(30) Foreign Application Priority Data

Nov. 12, 2012  (CN) .......................... 2012 1 0450994

(51) Int. Cl.
*G05F 1/00*  (2006.01)
*H02M 3/04*  (2006.01)
(Continued)

(52) U.S. Cl.
CPC .............. *H02M 3/04* (2013.01); *H02M 3/157* (2013.01); *H02M 3/1584* (2013.01); *H02M 2001/0009* (2013.01)

(58) Field of Classification Search
CPC ........... H02M 3/1588; H02M 3/1584; H02M 3/156; H02M 3/157
USPC .................................. 323/271–272, 282–285
See application file for complete search history.

(56) References Cited

U.S. PATENT DOCUMENTS 6,894,466 B2 *  5/2005  Huang ................ H02M 3/1584
                                                   323/272
7,888,918 B2 *  2/2011  Wu ....................... H02M 3/157
                                                   323/224
(Continued)

FOREIGN PATENT DOCUMENTS

CN           1287398 A       3/2001
CN           1700554 A      11/2005
(Continued)

OTHER PUBLICATIONS

International Search Report in international application No. PCT/CN2013/077719, mailed on Sep. 5, 2013.
(Continued)

*Primary Examiner* — Nguyen Tran
(74) *Attorney, Agent, or Firm* — Oppedahl Patent Law Firm LLC

(57) ABSTRACT

Provided are a digital current equalizing device, an analog current equalizing device, a current equalizing method and a system. The digital current equalizing device comprises: an output current sampling amplifying module (102), a digital processing module (104), and a main power frequency conversion module (106). An input terminal of the output current sampling amplifying module (102) connects to an output loop of a power supply, and an output terminal of the output current sampling amplifying module (102) connects to a current equalizing bus through a resistor R0, wherein the digital processing module (104) is configured to adjust an output voltage reference signal Vr according to a difference between an output voltage signal V2 of the output current sampling amplifying module (102) and an voltage signal Vbus of the current equalizing bus, and the main power frequency conversion module (106) is controlled to adjust the voltage according to the adjusted output voltage reference signal Vr'. The technical solution is easy to implement and can improve the reliabilities of each power supply module and the whole power supply system.

11 Claims, 7 Drawing Sheets

(51) Int. Cl.
*H02M 3/157* (2006.01)
*H02M 3/158* (2006.01)
*H02M 1/00* (2006.01)

(56) References Cited

U.S. PATENT DOCUMENTS

2006/0239046 A1   10/2006   Zane
2008/0012742 A1    1/2008   Wu
2010/0188062 A1    7/2010   Candage

FOREIGN PATENT DOCUMENTS

| | | |
|---|---|---|
| CN | 2750544 Y | 1/2006 |
| JP | 2004117134 A | 4/2004 |
| JP | 2005086846 A | 3/2005 |
| JP | 2008108119 A | 5/2008 |
| JP | 2008187850 A | 8/2008 |
| JP | 2009142028 A | 6/2009 |

OTHER PUBLICATIONS

English Translation of the Written Opinion of the International Search Authority in international application No. PCT/CN2013/077719, mailed on Sep. 5, 2013.
Single-wire current-share paralleling of current-mode controlled DC power supplies, mailed on May 17, 1998.
Im5080 Modular Current Sharing Controller, mailed on Oct. 3, 2011.
Masterless multirate control of parallel DC-DC converters, mailed on Feb. 21, 2010.
Supplementary European Search Report in European application No. 13788423.5, mailed on Aug. 4, 2015.

* cited by examiner

DIGITAL CURRENT EQUALIZING DEVICE, ANALOG CURRENT EQUALIZING DEVICE, CURRENT EQUALIZING METHOD AND SYSTEM

TECHNICAL FIELD

The disclosure relates to the field of communication, and in particular to a digital current equalizer, an analog current equalizer, and a current equalizing method and system.

BACKGROUND

To meet a reliability requirement and a power requirement of a load, in a power supply system, a number of power supply modules are often used in parallel by using a distributed system. During parallel use, as power supply modules differ, a current share on each module may differ from one another, leading to difference in current stress and thermal stress on each module, thereby reducing system reliability. To ensure equal currents (uniform current distribution) on multiple power supply modules in the system as well as uniform distribution of the current stress and thermal stress, current equalization has to be supported for power supply modules in parallel connection.

At present, a switching power supply is experiencing a transition from one with analog control to one with digital control. A digital power supply is efficient and has a high power density. Along with the notion of energy conservation, an efficient digital power supply wins increasing popularity in users. However, in an existing power supply system, complete replacement of any analog power supply by a digital power supply is yet to be achieved. That is, both digital and analog power supplies will be inserted and used in parallel in an existing power supply system. To ensure system and module reliability, current equalization has to be supported too in case both digital and analog power supplies are inserted, which poses a challenge.

At present, most modes of automatic current equalization control are based on analog-to-analog control or digital-to-digital control. There is a major difference in current equalization for analog power supplies and for digital power supplies. With such differentiated designs, either analog current equalization is adopted, in which case no current equalization can be performed on an inserted digital power supply; or digital current equalization is adopted, in which case no current equalization can be performed on an inserted analog power supply. Thus, no effective current equalization can be implemented in case both digital and analog power supplies are inserted in one power supply system. There is an existing challenge of implementing current equalization in case both digital and analog power supplies are inserted in one power supply system, so as to ensure reliability of a power supply module and of the entire power supply system.

With differentiated designs for digital current equalization and for analog current equalization in related art, no solution has been proposed for implementing effective current equalization in case both digital and analog power supplies are inserted in one power supply system.

SUMMARY

Embodiments of the disclosure provide a digital current equalizer, an analog current equalizer, and a current equalizing method and system, capable of implementing effective current equalization in case both digital and analog power supplies are inserted in one power supply system.

An aspect of embodiments of the disclosure provides a digital current equalizer, including an output-current sampling-and-amplifying module, a digital processing module, and a primary power converting module. An input terminal of the output-current sampling-and-amplifying module is connected to an output loop of a power supply, and an output terminal of the output-current sampling-and-amplifying module is connected, via a resistor $R0$, to a current equalizing bus. The digital processing module is configured for: adjusting, according to a difference between an output voltage signal $V2$ of the output-current sampling-and-amplifying module and a voltage signal $Vbus$ of the current equalizing bus, an output voltage reference signal $Vr$; and controlling, according to the adjusted output voltage reference signal $Vr'$, the primary power converting module to perform voltage adjustment.

The digital current equalizer may further include a current equalization controlling module. A first input terminal of the current equalization controlling module may be connected to the output voltage signal $V2$ of the output-current sampling-and-amplifying module. A second input terminal of the current equalization controlling module may be connected to the voltage signal $Vbus$ of the current equalizing bus. An output terminal of the current equalization controlling module may be connected to the digital processing module. The current equalization controlling module may be configured for outputting a voltage signal $V3$ representing the difference between the output voltage signal $V2$ of the output-current sampling-and-amplifying module and the voltage signal $Vbus$ of the current equalizing bus. The digital processing module may be configured for: adjusting, according to the voltage signal $V3$, the output voltage reference signal $Vr$; and controlling, according to the adjusted output voltage reference signal $Vr'$, the primary power converting module to perform voltage adjustment.

The digital current equalizer may further include a digital processing peripheral module and an output voltage feedback module. The output of the output voltage feedback module and the output of the current equalization controlling module may be connected, via the digital processing peripheral module, to the digital processing module. The output voltage feedback module may be configured for obtaining, according to an actual output voltage $V0$ of the power supply, an output voltage feedback signal $Vf$. The digital processing peripheral module may be configured for converting the voltage signal $V3$ and the output voltage feedback signal $Vf$ output by the output voltage feedback module respectively to signals $V3'$ and $Vf'$ prepared for an analog to digital conversion and sampling operation by the digital processing module. The digital processing module may be configured for: adjusting, according to the signal $V3'$ obtained after converting the voltage signal $V3$ by the digital processing peripheral module, the output voltage reference signal $Vr$; and controlling, according to the signal $Vf'$ obtained after converting the output voltage feedback signal $Vf$ by the digital processing peripheral module and the adjusted output voltage reference signal $Vr'$, the primary power converting module to perform voltage adjustment.

The digital processing module may include: a first A/D sample converting channel configured for converting the signals $V3'$ and $Vf'$ obtained after conversion by the digital processing peripheral module respectively to digital signals $V3'$ and $Vf'$; a biasing module configured for biasing the digital signal $V3'$ to obtain a current equalizing loop error; a first PI regulation module configured for performing PI regulation on the current equalizing loop error to obtain a current equalizing loop output; a first digital operation module configured for performing digital operation on digital the output voltage reference signal Vr and the current equalizing loop output to obtain the adjusted output voltage reference signal Vr', the digital operation being weighted addition in case that a backward input terminal of the current equalization controlling module is connected to the output voltage signal V2 of the output-current sampling-and-amplifying module and a forward input terminal of the current equalization controlling module is connected to the voltage signal Vbus of the current equalizing bus, or the digital operation being weighted subtraction with the digital output voltage reference signal Vr as a minuend and the current equalizing loop output as a subtrahend in case that a forward input terminal of the current equalization controlling module is connected to the output voltage signal V2 of the output-current sampling-and-amplifying module and a backward input terminal of the current equalization controlling module is connected to the voltage signal Vbus of the current equalizing bus; a second digital operation module configured for performing digital operation on the adjusted output voltage reference signal Vr' and the digital signal Vf' obtained after conversion to obtain a voltage loop error, the digital operation being weighted subtraction with the Vr' as a minuend and the digital signal Vf' as a subtrahend; a second PI regulation module configured for performing PI regulation on the voltage loop error to obtain a voltage loop output; and a first modulating signal producing module configured for producing, according to the voltage loop output, a modulating signal.

The current equalization controlling module may include one of an analog current equalization controller circuit and an operation amplifier circuit.

The output terminal of the output-current sampling-and-amplifying module and the current equalizing bus may be connected to the digital processing module.

The digital current equalizer may further include a digital processing peripheral module and an output voltage feedback module. An output terminal of the output voltage feedback module, the output terminal of the output-current sampling-and-amplifying module, and an output terminal of the current equalizing bus may be connected, via the digital processing peripheral module, to the digital processing module. The output voltage feedback module may be configured for obtaining, according to an actual output voltage V0 of the power supply, an output voltage feedback signal Vf. The digital processing peripheral module may be configured for converting the output voltage signal V2 of the output-current sampling-and-amplifying module, the voltage signal Vbus of the current equalizing bus, and the output voltage feedback signal Vf output by the output voltage feedback module respectively to signals V2', Vbus', and Vf' prepared for an analog to digital conversion and sampling operation by the digital processing module. The digital processing module may be configured for: adjusting, according to the signal V2' obtained after converting the output voltage signal V2 by the digital processing peripheral module and the signal Vbus' obtained after converting the voltage signal Vbus by the digital processing peripheral module, the output voltage reference signal Vr; and controlling, according to the signal Vf' obtained after converting the output voltage feedback signal Vf by the digital processing peripheral module and the adjusted output voltage reference signal Vr', the primary power converting module to perform voltage adjustment.

The digital processing module may include: a second A/D sample converting channel configured for converting the signals V2', Vbus', and Vf' obtained after conversion by the digital processing peripheral module respectively to digital signals V2', Vbus', and Vf'; a third digital operation module configured for performing digital operation on the digital signals V2' and Vbus' to obtain a current equalizing loop error, the digital operation being weighted subtraction with the digital signal V2' as a minuend and the digital signal Vbus' as a subtrahend, or with the digital signal Vbus' as a minuend and the digital signal V2' as a subtrahend; a third PI regulation module configured for performing PI regulation on the current equalizing loop error to obtain a current equalizing loop output; a fourth digital operation module configured for performing digital operation on the current equalizing loop output and the digital output voltage reference signal Vr to obtain the adjusted output voltage reference signal Vr', the digital operation being weighted subtraction with the digital output voltage reference signal Vr as a minuend and the current equalizing loop output as a subtrahend in case that the digital signal V2' serves as the minuend and the digital signal Vbus' serves as the subtrahend, or the digital operation being weighted addition in case that the digital signal Vbus' serves as the minuend and the digital signal V2' serves as the subtrahend; a fifth digital operation module configured for performing digital operation on the adjusted output voltage reference signal Vr' and the digital signal Vf' obtained after conversion to obtain a voltage loop error, the digital operation being weighted subtraction with the Vr' as a minuend and the digital signal Vf' as a subtrahend; a fourth PI regulation module configured for performing PI regulation on the voltage loop error to obtain a voltage loop output; and a second modulating signal producing module configured for producing, according to the voltage loop output, a modulating signal.

The digital current equalizer may further include a driving module configured for producing, under the control of the digital processing module, a driving signal. The primary power converting module may be configured for performing voltage adjustment according to the driving signal.

The output-current sampling-and-amplifying module may include an output current sampling module and a current sample amplifying module. The output current sampling module may be connected to a positive terminal or a negative terminal of the output loop. An output signal of the output current sampling module may serve as an input signal of the current sample amplifying module . An output terminal of the current sample amplifying module may be connected, via the resistor R0, to the current equalizing bus.

An aspect of embodiments of the disclosure provides an analog current equalizer, including an output-current sampling-and-amplifying module, a current equalization controlling module, an adjusting module, a voltage error amplifying module, and a primary power converting module. An input terminal of the output-current sampling-and-amplifying module may be connected to an output loop of an analog power supply. An output terminal of the output-current sampling-and-amplifying module may be connected, via a resistor R0, to a current equalizing bus. A first input terminal of the current equalization controlling module may be connected to an output voltage signal V2 of the output-current sampling-and-amplifying module. A second input terminal of the current equalization controlling module may be connected to a voltage signal Vbus of the current equalizing bus. The current equalization controlling module may be configured for outputting a voltage signal V3 representing a difference between the output voltage signal V2 of the output-current sampling-and-amplifying module and the voltage signal Vbus of the current equalizing bus. The adjusting module may be configured for adjusting, according to the voltage signal V3, an output voltage reference signal Vr. An opposite-phase input terminal of the voltage error amplifying module may be connected to the output voltage feedback signal Vf. A same-phase input terminal of the voltage error amplifying module may be connected to an adjusted output voltage reference signal Vr' output by the adjusting module. The voltage error amplifying module may be configured for controlling, according to the adjusted output voltage reference signal Vr' and the output voltage feedback signal Vf, the primary power converting module to perform voltage adjustment.

An aspect of embodiments of the disclosure provides a current equalizing system, including one or more analog power supplies and one or more digital power supplies. Outputs of the one or more analog power supplies and the one or more digital power supplies may be connected in parallel. Current equalizing buses of the one or more analog power supplies and the one or more digital power supplies may be connected to each other. The one or more digital power supplies may include an aforementioned digital current equalizer. The one or more analog power supplies may include an aforementioned analog current equalizer.

An aspect of embodiments of the disclosure provides a current equalizing method, including: adjusting, according to a difference between an output voltage signal V2 of an output-current sampling-and-amplifying module and a voltage signal Vbus of a current equalizing bus, an output voltage reference signal Vr, an input terminal of the output-current sampling-and-amplifying module being connected to an output loop of a power supply, and an output terminal of the output-current sampling-and-amplifying module being connected, via a resistor R0, to the current equalizing bus; and performing voltage adjustment on the power supply according to the adjusted output voltage reference signal Vr'.

With embodiments of the disclosure, it is possible to implement effective current equalization in case both digital and analog power supplies are inserted in one power supply system. The solution is easy to implement, and can enhance reliability of a power supply module and of the entire power supply system.

DETAILED DESCRIPTION

The disclosure is elaborated below with reference to drawings and embodiments. Note that in case of no conflict, embodiments and characteristics thereof in the disclosure may be combined with each other.

Apparatus Embodiment

There is a major difference in current equalization for analog power supplies and for digital power supplies. With such differentiated designs, either analog current equalization is adopted, in which case no current equalization can be performed on an inserted digital power supply; or digital current equalization is adopted, in which case no current equalization can be performed on an inserted analog power supply. Thus, no effective current equalization can be implemented in case both digital and analog power supplies are inserted in one power supply system. In view of this, a digital current equalizer is provided in an embodiment.

Figure 1:
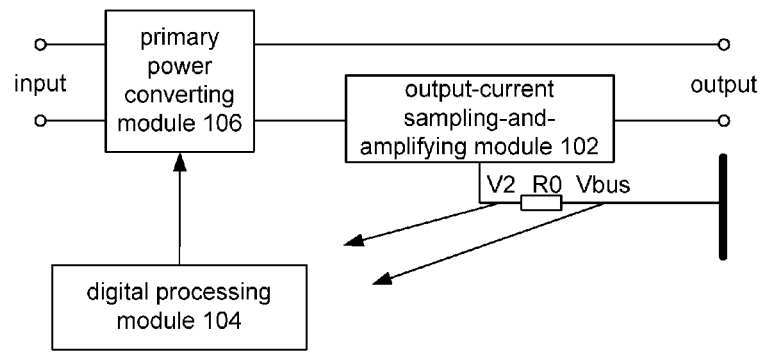
FIG. 1 is a block diagram of a structure of a digital current equalizer according to an embodiment of the disclosure.

FIG. 1 is a block diagram of a structure of a digital current equalizer according to an embodiment of the disclosure. As shown in FIG. 1, the digital current equalizer includes an output-current sampling-and-amplifying module 102, a digital processing module 104, and a primary power converting module 106. An input terminal of the output-current sampling-and-amplifying module 102 may be connected to an output loop of a power supply. An output terminal of the output-current sampling-and-amplifying module 102 may be connected, via a resistor R0, to a current equalizing bus. The digital processing module 104 may be configured for: adjusting, according to a difference between an output voltage signal V2 of the output-current sampling-and-amplifying module 102 and a voltage signal Vbus of the current equalizing bus, an output voltage reference signal Vr; and controlling, according to the adjusted output voltage reference signal Vr', the primary power converting module 106 to perform voltage adjustment.

With the digital current equalizer, current equalization for a digital power supply may be implemented. In addition, with a processing basis same as that for analog current equalization, the digital current equalizer also applies to digital current equalization in case both digital and analog power supplies are inserted in one power supply system. The digital current equalizer is easy to implement and may implement current equalization in case both digital and analog power supplies are inserted in one power supply system, thereby enhancing reliability of a power supply module and of the entire power supply system.

Figure 2:
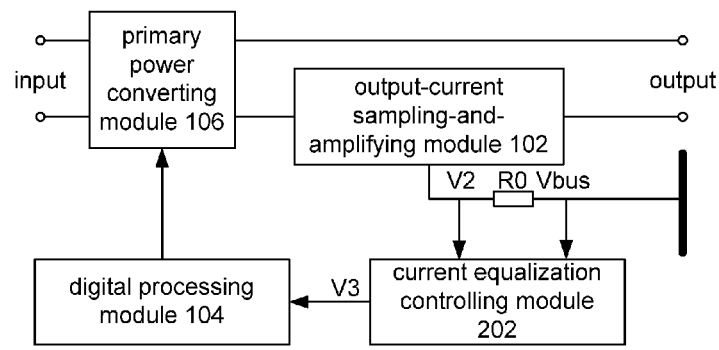
FIG. 2 is a block diagram of a first structure of a digital current equalizer according to an embodiment of the disclosure.

FIG. 2 is a block diagram of a first structure of a digital current equalizer according to an embodiment of the disclosure. As shown in FIG. 2, the digital current equalizer may further include a current equalization controlling module 202. A first input terminal of the current equalization controlling module 202 may be connected to the output voltage signal V2 of the output-current sampling-and-amplifying module 102. A second input terminal of the current equalization controlling module 202 may be connected to the voltage signal Vbus of the current equalizing bus. An output terminal of the current equalization controlling module 202 may be connected to the digital processing module 104. The current equalization controlling module 202 may be configured for outputting a voltage signal V3 that can represent the difference between the output voltage signal V2 of the output-current sampling-and-amplifying module 102 and the voltage signal Vbus of the current equalizing bus. The digital processing module 104 may be configured for: adjusting, according to the voltage signal V3 output by the current equalization controlling module 202, the output voltage reference signal Vr; and controlling, according to the adjusted output voltage reference signal Vr', the primary power converting module 106 to perform voltage adjustment.

The current equalization controlling module 202 may generate the current equalizing signal V3 via an analog circuit. The current equalization controlling module 202 may be implemented by an analog current equalization controller circuit or an operation amplifier circuit. The digital processing module 104 may adjust the output of a digital power supply by adjusting the output voltage reference signal according to the output signal of the current equalization controlling module 202 to achieve current equalization.

Figure 3:
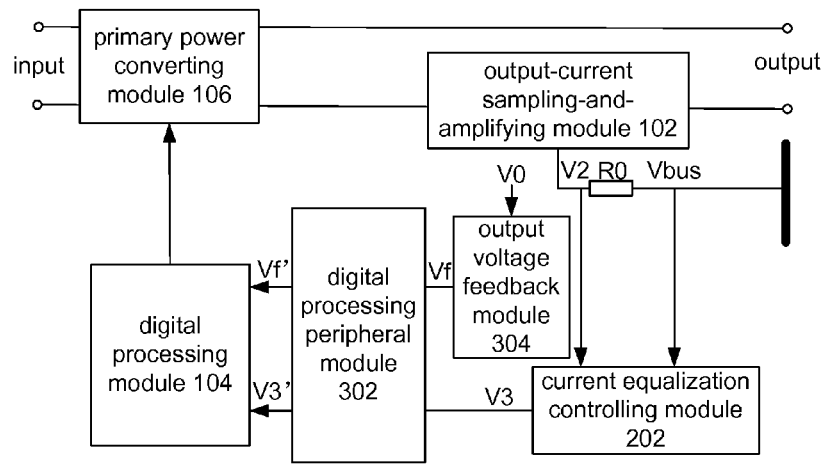
FIG. 3 is a block diagram of a second structure of a digital current equalizer according to an embodiment of the disclosure.

To facilitate signal processing by the digital processing module 104, a digital processing peripheral module may be added to perform pre-conversion on an input of the digital processing module 104. FIG. 3 is a block diagram of a second structure of a digital current equalizer according to an embodiment of the disclosure. As shown in FIG. 3, the digital current equalizer may further include a digital processing peripheral module 302 and an output voltage feedback module 304. The output of the output voltage feedback module 304 and the output of the current equalization controlling module 202 may be connected to the digital processing module 104 via the digital processing peripheral module 302. The output voltage feedback module 304 may be configured for obtaining an output voltage feedback signal Vf according to an actual output voltage V0 of the power supply. The digital processing peripheral module 302 may be configured for converting the voltage signal V3 output by the current equalization controlling module 202 and the output voltage feedback signal Vf output by the output voltage feedback module 304 respectively to signals V3' and Vf' prepared for an analog to digital conversion and sampling operation by the digital processing module 104.

The digital processing module 104 may be configured for: adjusting the output voltage reference signal Vr according to the signal V3' obtained after converting the voltage signal V3 by the digital processing peripheral module 302; and controlling the primary power converting module 106 to perform voltage adjustment according to the signal Vf' obtained after converting the output voltage feedback signal Vf by the digital processing peripheral module 302 and according to the adjusted output voltage reference signal Vr'.

Figure 4:
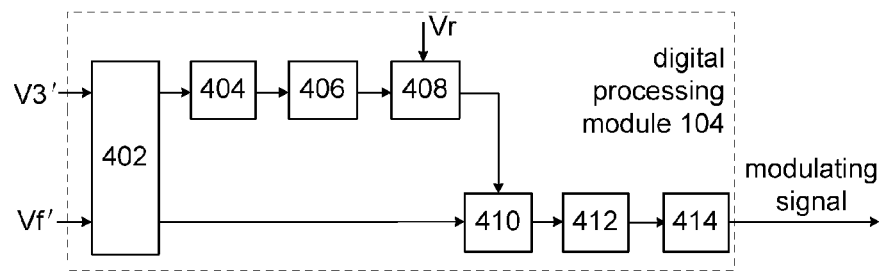
FIG. 4 is a block diagram of a first structure of a digital processing module 104 according to an embodiment of the disclosure.

FIG. 4 is a block diagram of a first structure of a digital processing module 104 according to an embodiment of the disclosure. As shown in FIG. 4, the digital processing module 104 may include a first A/D sample converting channel 402, a biasing module 404, a first PI regulation module 406, a first digital operation module 408, a second digital operation module 410, a second PI regulation module 412, and a first modulating signal producing module 414. The first A/D sample converting channel 402 may be configured for converting the signals V3' and Vf' (obtained after conversion by the digital processing peripheral module 302) respectively to digital signals V3' and Vf'. The biasing module 404 may be configured for biasing the digital signal V3' to obtain a current equalizing loop error. The first PI regulation module 406 may be configured for performing PI regulation on the current equalizing loop error to obtain a current equalizing loop output. The first digital operation module 408 may be configured for performing digital operation on digital output voltage reference signal Vr and the current equalizing loop output to obtain the adjusted output voltage reference signal Vr'. The digital operation may be weighted addition in case that a backward input terminal of the current equalization controlling module 202 is connected to the output voltage signal V2 of the output-current sampling-and-amplifying module 102 and a forward input terminal of the current equalization controlling module 202 is connected to the voltage signal Vbus of the current equalizing bus. The digital operation may be weighted subtraction with the digital output voltage reference signal Vr as a minuend and the current equalizing loop output as a subtrahend in case that a forward input terminal of the current equalization controlling module 202 is connected to the output voltage signal V2 of the output-current sampling-and-amplifying module 102 and a backward input terminal of the current equalization controlling module 202 is connected to the voltage signal Vbus of the current equalizing bus. The second digital operation module 410 may be configured for performing digital operation on the adjusted output voltage reference signal Vr' and the digital signal Vf' obtained after conversion to obtain a voltage loop error. The digital operation may be weighted subtraction with the Vr' as a minuend and the digital signal Vf' as a subtrahend. The second PI regulation module 412 may be configured for performing PI regulation on the voltage loop error to obtain a voltage loop output. The first modulating signal producing module 414 may be configured for producing, according to the voltage loop output, a modulating signal.

Figure 5:
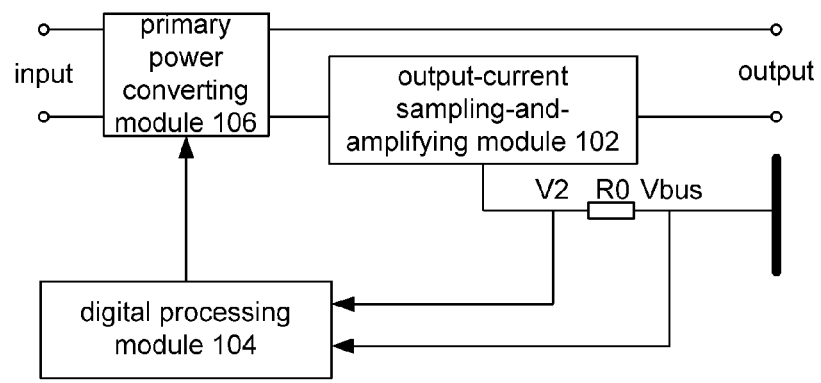
FIG. 5 is a block diagram of a third structure of a digital current equalizer according to an embodiment of the disclosure.

FIG. 5 is a block diagram of a third structure of a digital current equalizer according to an embodiment of the disclosure. As shown in FIG. 5, the output of the output-current sampling-and-amplifying module 102 and the current equalizing bus may be connected to the digital processing module 104. The digital processing module 104 may determine the difference between the output voltage signal V2 of the output-current sampling-and-amplifying module 102 and the voltage signal Vbus of the current equalizing bus to adjust the output voltage reference signal Vr and adjust the output of a digital power supply to achieve current equalization.

Figure 6:
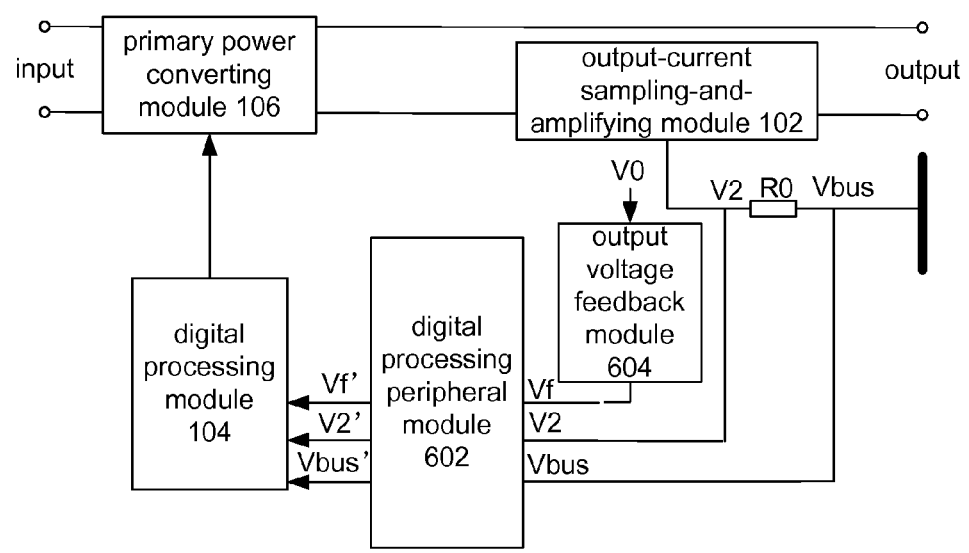
FIG. 6 is a block diagram of a fourth structure of a digital current equalizer according to an embodiment of the disclosure.

To facilitate signal processing by the digital processing module 104, a digital processing peripheral module may be added to perform pre-conversion on an input of the digital processing module 104. FIG. 6 is a block diagram of a fourth structure of a digital current equalizer according to an embodiment of the disclosure. As shown in FIG. 6, the digital current equalizer may further include a digital processing peripheral module 602 and an output voltage feedback module 604. An output terminal of the output voltage feedback module 604, the output terminal of the output-current sampling-and-amplifying module 102, and an output terminal of the current equalizing bus may be connected to the digital processing module 104 via the digital processing peripheral module 602. The output voltage feedback module 604 may be configured for obtaining an output voltage feedback signal Vf according to an actual output voltage V0 of the power supply. The digital processing peripheral module 602 may be configured for converting the output voltage signal V2 of the output-current sampling-and-amplifying module 102, the voltage signal Vbus of the current equalizing bus, and the output voltage feedback signal Vf output by the output voltage feedback module 604 respectively to signals V2', Vbus', and Vf' prepared for an analog to digital conversion and sampling operation by the digital processing module 104. The digital processing module 104 may be configured for: adjusting the output voltage reference signal Vr according to the signal V2' obtained after converting the output voltage signal V2 by the digital processing peripheral module 602 and the signal Vbus' obtained after converting the voltage signal Vbus by the digital processing peripheral module 602; and controlling the primary power converting module 106 to perform voltage adjustment according to the signal Vf' obtained after converting the output voltage feedback signal Vf by the digital processing peripheral module 602 and according to the adjusted output voltage reference signal Vr'.

Figure 7:
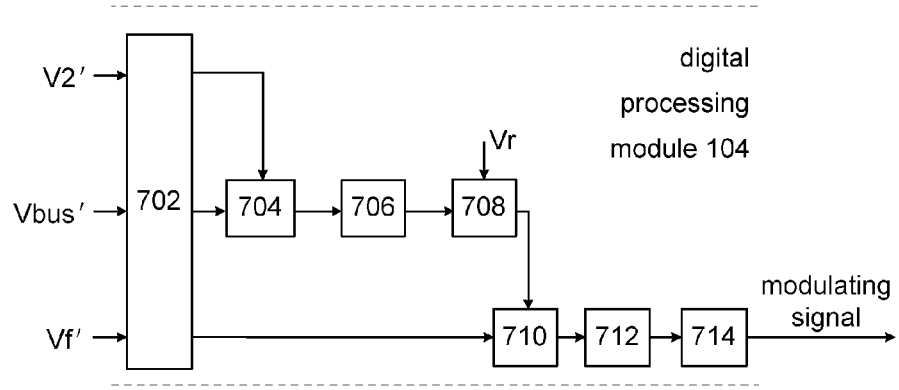
FIG. 7 is a block diagram of a second structure of a digital processing module 104 according to an embodiment of the disclosure.

FIG. 7 is a block diagram of a second structure of a digital processing module 104 according to an embodiment of the disclosure. As shown in FIG. 7, the digital processing module 104 may include a second A/D sample converting channel 702, a third digital operation module 704, a third PI regulation module 706, a fourth digital operation module 708, a fifth digital operation module 710, a fourth PI regulation module 712, and a second modulating signal producing module 714. The second A/D sample converting channel 702 may be configured for converting the signals V2', Vbus', and Vf' obtained after conversion by the digital processing peripheral module 602 respectively to digital signals V2', Vbus', and Vf'. The third digital operation module 704 may be configured for performing digital operation on the digital signals V2' and Vbus' to obtain a current equalizing loop error. The digital operation may be weighted subtraction with the digital signal V2' as a minuend and the digital signal Vbus' as a subtrahend, or with the digital signal Vbus' as a minuend and the digital signal V2' as a subtrahend. The third PI regulation module 706 may be configured for performing PI regulation on the current equalizing loop error to obtain a current equalizing loop output. The fourth digital operation module 708 may be configured for performing digital operation on the current equalizing loop output and the digital output voltage reference signal Vr to obtain the adjusted output voltage reference signal Vr'. The digital operation may be weighted subtraction with the digital output voltage reference signal Vr as a minuend and the current equalizing loop output as a subtrahend in case that the digital signal V2' serves as the minuend and the digital signal Vbus' serves as the subtrahend. The digital operation may be weighted addition in case that the digital signal Vbus' serves as the minuend and the digital signal V2' serves as the subtrahend. The fifth digital operation module 710 may be configured for performing digital operation on the adjusted output voltage reference signal Vr' and the digital signal Vf' obtained after conversion to obtain a voltage loop error. The digital operation may be weighted subtraction with the Vr' as a minuend and the digital signal Vf' as a subtrahend. The fourth PI regulation module 712 may be configured for performing PI regulation on the voltage loop error to obtain a voltage loop output. The second modulating signal producing module 714 may be configured for producing, according to the voltage loop output, a modulating signal.

Figure 8:
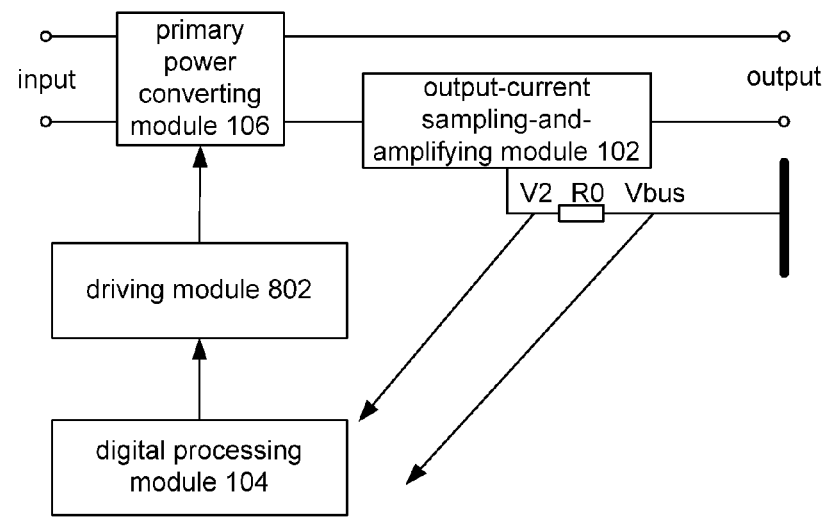
FIG. 8 is a block diagram of a fifth structure of a digital current equalizer according to an embodiment of the disclosure.

FIG. 8 is a block diagram of a fifth structure of a digital current equalizer according to an embodiment of the disclosure. As shown in FIG. 8, the digital current equalizer may further include a driving module 802 configured for producing a driving signal under the control of the digital processing module 104. The primary power converting module 106 may be configured for performing voltage adjustment according to the driving signal.

Figure 9:
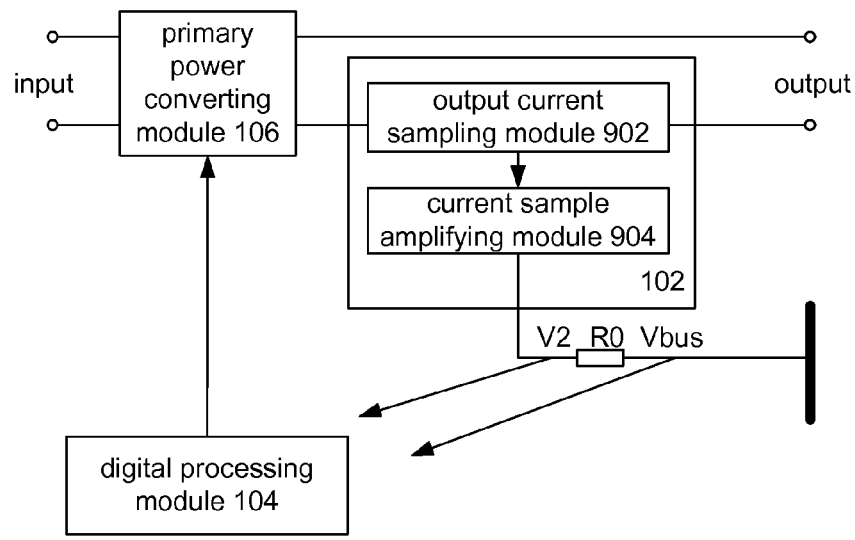
FIG. 9 is a block diagram of a sixth structure of a digital current equalizer according to an embodiment of the disclosure.

FIG. 9 is a block diagram of a sixth structure of a digital current equalizer according to an embodiment of the disclosure. As shown in FIG. 9, the output-current sampling-and-amplifying module 102 may include an output current sampling module 902 and a current sample amplifying module 904. The output current sampling module 902 may be connected to a positive terminal of the output loop or a negative terminal of the output loop. An output signal of the output current sampling module 902 may serve as an input signal of the current sample amplifying module 904. An output terminal of the current sample amplifying module 904 may be connected to the current equalizing bus via the resistor R0.

Note that the output-current sampling-and-amplifying module 102, the primary power converting module 106, the current equalization controlling module 202, the digital processing peripheral module 302, the output voltage feedback module 304, the digital processing peripheral module 602, the output voltage feedback module 604, the driving module 802, the output current sampling module 902 and the current sample amplifying module 904 may all be implemented by circuits. The digital processing module 104 may be implemented by a digital processor. Any module inside the digital processing module 104 may be implemented by running relevant codes inside the digital processing module 104.

Figure 10:
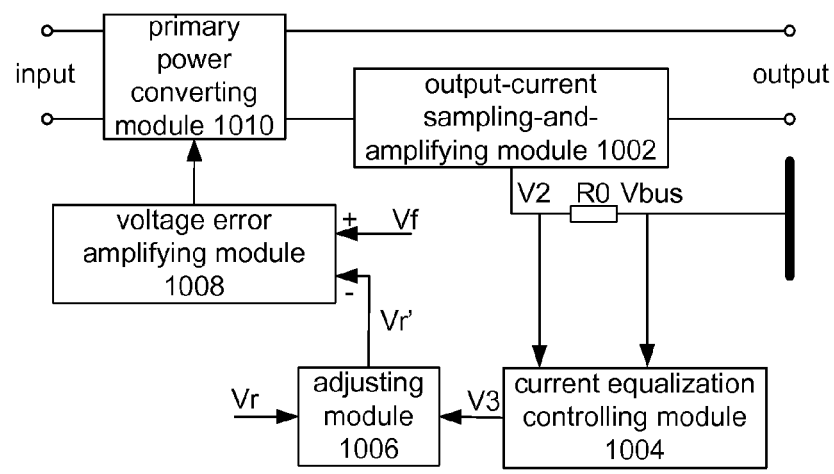
FIG. 10 is an analog current equalizer according to an embodiment of the disclosure.

Embodiments of the disclosure further provide an analog current equalizer, which may be configured in an analog power supply to implement current equalization. FIG. 10 is an analog current equalizer according to an embodiment of the disclosure. As shown in FIG. 10, the analog current equalizer may include an output-current sampling-and-amplifying module 1002, a current equalization controlling module 1004, an adjusting module 1006, a voltage error amplifying module 1008, and a primary power converting module 1010. An input terminal of the output-current sampling-and-amplifying module 1002 may be connected to an output loop of an analog power supply. An output terminal of the output-current sampling-and-amplifying module 1002 may be connected to a current equalizing bus via a resistor R0. A first input terminal of the current equalization controlling module 1004 may be connected to an output voltage signal V2 of the output-current sampling-and-amplifying module 1002. A second input terminal of the current equalization controlling module 1004 may be connected to a voltage signal Vbus of the current equalizing bus. The current equalization controlling module 1004 may be configured for outputting a voltage signal V3 that can represent a difference between the output voltage signal V2 of the output-current sampling-and-amplifying module and the voltage signal Vbus of the current equalizing bus. The adjusting module 1006 may be configured for adjusting an output voltage reference signal Vr according to the voltage signal V3. An opposite-phase input terminal of the voltage error amplifying module 1008 may be connected to the output voltage feedback signal Vf. A same-phase input terminal of the voltage error amplifying module 1008 may be connected to an adjusted output voltage reference signal Vr' output by the adjusting module 1006. The voltage error amplifying module 1008 may be configured for controlling the primary power converting module 1010 to perform voltage adjustment according to the adjusted output voltage reference signal Vr' and the output voltage feedback signal Vf.

With the analog current equalizer, current equalization of a power supply may be implemented. In addition, the analog current equalizer uses a basis for controlling current equalization same as that used by the digital current equalizer. Therefore, in case both digital and analog power supplies are inserted in one power supply system, an analog power supply configured with an analog current equalizer and a digital power supply configured with a digital current equalizer may work effectively at the same time. Thus, in case both digital and analog power supplies are inserted in one power supply system, control of current equalization for both analog and digital power supplies can be implemented at the same time, implementing current equalization in this case and enhancing reliability of a power supply module and of the entire power supply system.

In an analog current equalizer, the output-current sampling-and-amplifying module 1002 also may include an output current sampling module and a current sample amplifying module. The output current sampling module may be connected to a positive terminal of the output loop or a negative terminal of the output loop. An output signal of the output current sampling module may serve as an input signal of the current sample amplifying module. An output terminal of the current sample amplifying module may be connected to the current equalizing bus via the resistor R0.

Furthermore, an analog current equalizer also may include a driving module configured for producing a driving signal under the control of the digital processing module 1004. The primary power converting module 1006 may be configured for performing voltage adjustment according to the driving signal.

Note that the output-current sampling-and-amplifying module 1002, the current equalization controlling module 1004, the adjusting module 1006, the voltage error amplifying module 1008, the primary power converting module 1010, the driving module, the output current sampling module, and the current sample amplifying module may all be implemented by circuits.

Figure 11:
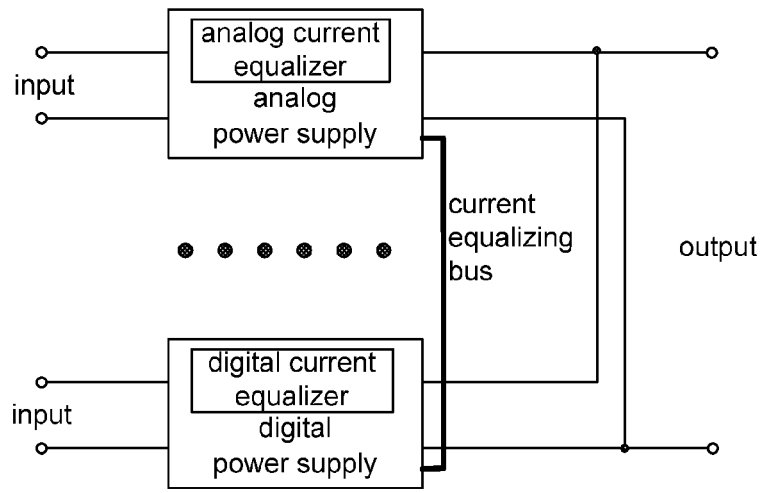
FIG. 11 is a block diagram of a structure of a current equalizing system according to an embodiment of the disclosure.

Embodiments of the disclosure further provide a current equalizing system. FIG. 11 is a block diagram of a structure of a current equalizing system according to an embodiment of the disclosure. As shown in FIG. 11, the system may include one or more analog power supplies and one or more digital power supplies. Outputs of such power supplies may be connected in parallel. Current equalizing buses of such power supplies may be connected to each other. Such a digital power supply may include an aforementioned digital current equalizer. Such an analog power supply may include an aforementioned analog current equalizer.

Method Embodiment

Figure 12:
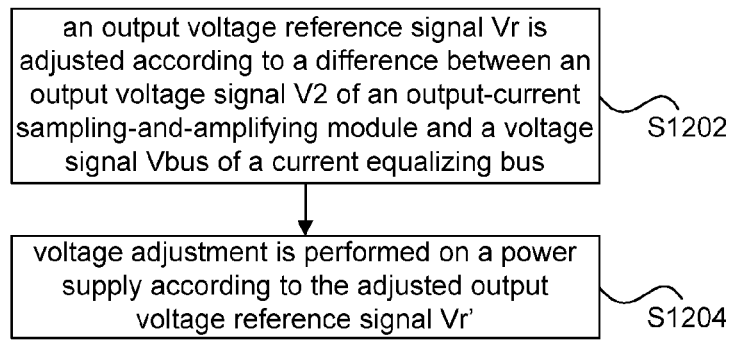
FIG. 12 is a flowchart of a current equalizing method according to an embodiment of the disclosure.

FIG. 12 is a flowchart of a current equalizing method according to an embodiment of the disclosure. As shown in FIG. 12, the method may include steps as follows.

In step S1202, an output voltage reference signal Vr is adjusted according to a difference between an output voltage signal V2 of an output-current sampling-and-amplifying module and a voltage signal Vbus of a current equalizing bus. An input terminal of the output-current sampling-and-amplifying module is connected to an output loop of a power supply. An output terminal of the output-current sampling-and-amplifying module is connected, via a resistor R0, to the current equalizing bus.

In step S1204, voltage adjustment is performed on a power supply according to the adjusted output voltage reference signal Vr'.

With the method, it is possible to implement control of current equalization for both analog and digital power supplies. The method may include, but is not limited to, an application in a case with both digital and analog power supplies inserted in one power supply system. It is possible to implement control of current equalization for both analog and digital power supplies at the same time, implementing current equalization in case both digital and analog power supplies are inserted in one power supply system and enhancing reliability of a power supply module and of the entire power supply system.

The constitution and principle of a current equalizing solution provided by the disclosure is elaborated below with embodiments.

Embodiment 1

Figure 13:
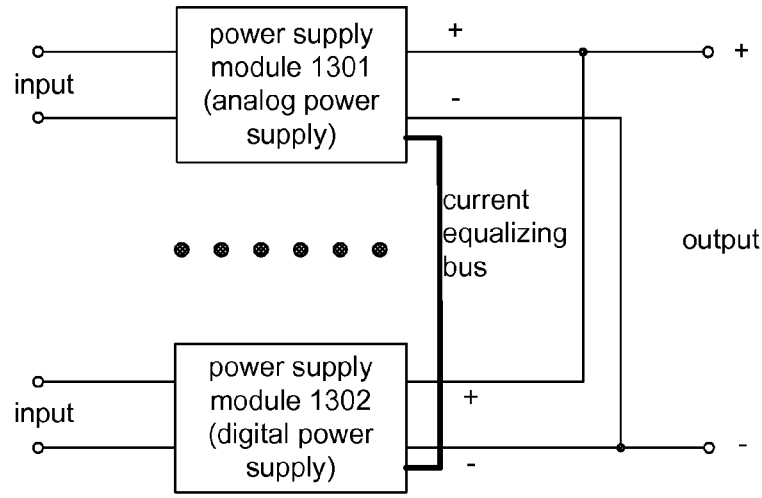
FIG. 13 is a schematic diagram of digital and analog power supplies inserted in parallel according to an embodiment of the disclosure.

The embodiment provides an automatic current equalizer for digital and analog hybrid control. By automatic current equalization, current equalization can be implemented in case both digital and analog power supplies are inserted in one power supply system. FIG. 13 is a schematic diagram of digital and analog power supplies inserted in parallel according to an embodiment of the disclosure. As shown in FIG. 13, multiple power supply modules are used in parallel. For simplicity, only two power supply modules are shown in FIG. 13. A power supply module 1301 is analog. A power supply module 1302 is digital. The omission mark denotes any other power supply module not shown. In case both digital and analog power supplies are inserted in one power supply system, outputs of the power supply modules are directly connected in parallel, and external current equalizing buses of the power supply modules are also directly connected to each other.

The automatic current equalizer may include a current equalizing circuit inside an analog power supply and a current equalizing circuit inside a digital power supply.

Figure 14:
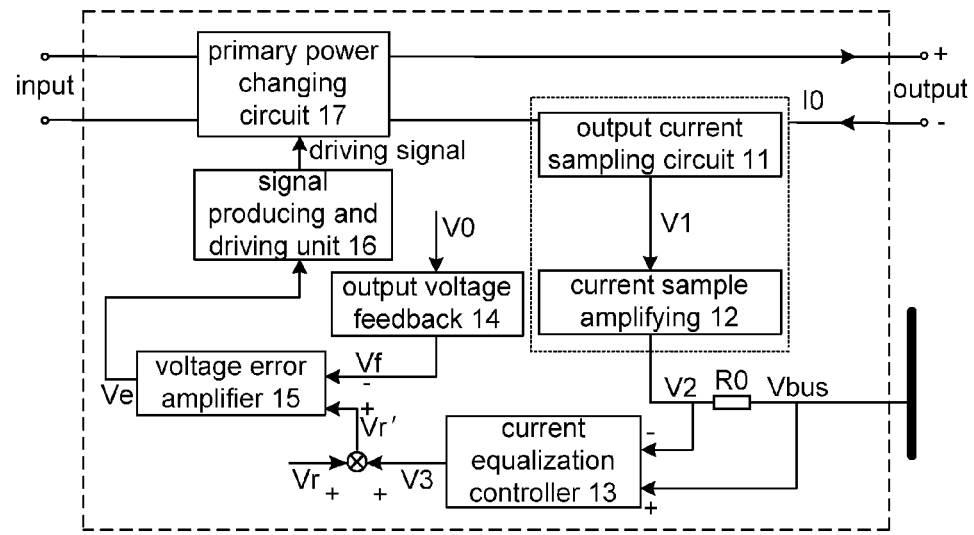
FIG. 14 is a block diagram of a current equalizing circuit inside an analog power supply according to an embodiment of the disclosure.

FIG. 14 is a block diagram of a current equalizing circuit inside an analog power supply according to an embodiment of the disclosure. As shown in FIG. 14, in the automatic current equalizer, a current equalizing circuit inside an analog power supply may include an output current sampling circuit 11, an output current amplifying circuit 12, a current equalization controller circuit 13, a voltage error amplifying circuit 15, an output voltage feedback circuit 14, a signal producing and driving unit circuit 16 for converting an error voltage output by the voltage error amplifying circuit into a driving signal, and a primary power changing circuit 17. The output current sampling circuit 11 may be located on an output loop. The output signal of the output current sampling circuit 11 may serve as an input signal of the current sample amplifying circuit 12. An output signal of the current sample amplifying circuit 12 may be connected to a current equalizing bus via a resistor R0. A first input terminal of the current equalization controller 13 may be connected to the output signal of the current sample amplifying circuit 12. A second input terminal of the current equalization controller 13 may be connected to the voltage signal of the current equalizing bus. The output voltage reference after current equalization may be obtained via analog circuit operation of the output signal of the current equalization controller 13 and an output voltage reference signal. The output voltage feedback signal may be obtained from an actual output voltage via the output voltage feedback circuit 14. The output voltage feedback signal may serve as an opposite-phase input of the voltage error amplifier 15. The output voltage reference after current equalization may serve as a same-phase input of the voltage error amplifier 15. A driving signal may be obtained from an output signal of the voltage error amplifier via the signal producing and driving unit circuit 16. Finally, a relevant power device in the primary power changing circuit 17 may be driven by the driving signal.

There may be two processing modes inside a digital power supply in the automatic current equalizer, that is, one with an analog current equalization controlling circuit, the other without any analog current equalization controlling circuit.

Figure 15:
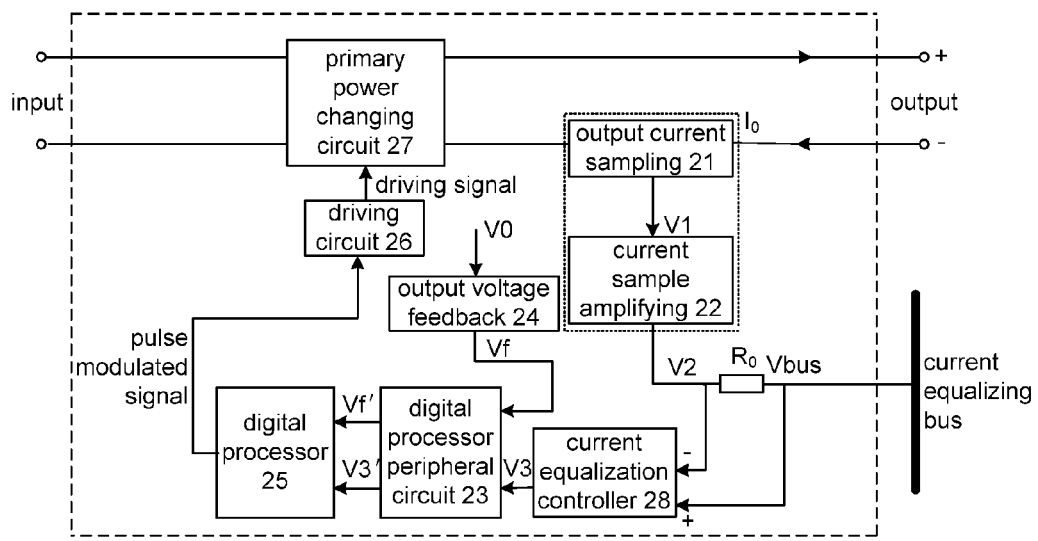
FIG. 15 is a block diagram of a current equalizing circuit with an analog current equalization controller inside a digital power supply according to an embodiment of the disclosure.

FIG. 15 is a block diagram of a current equalizing circuit with an analog current equalization controller inside a digital power supply according to an embodiment of the disclosure. As shown in FIG. 15, the current equalizing circuit inside the digital power supply with an analog current equalization controlling circuit may include an output current sampling circuit 21, an output current amplifying circuit 22, an output voltage feedback circuit 24, a current equalization controller circuit 28, a digital processor peripheral circuit 23, a digital processor 25, a driving circuit 26, and a primary power changing circuit 27. The output current sampling circuit 21 may be located on an output loop. An output signal of the output current sampling circuit 21 may serve as an input signal of the current sample amplifying circuit 22. An output signal of the current sample amplifying circuit 22 may be connected to a current equalizing bus via a resistor R0. A first input terminal of the current equalization controller 28 may be connected to the output signal of the current sample amplifying circuit 22. A second input terminal of the current equalization controller 28 may be connected to the voltage signal of the current equalizing bus. An output voltage feedback signal may be obtained from an actual output voltage via the output voltage feedback circuit 24. An output of the current equalization controller 28 and the output voltage feedback signal may be sent to the digital processor 25 via the digital processor peripheral circuit 23. The digital processor 25 may output a modulating signal by performing sampling and related operation on the two signals. The modulating signal may produce a driving signal via the driving circuit 26. Finally, the driving signal may drive a relevant power device in the primary power changing circuit 27.

Figure 16:
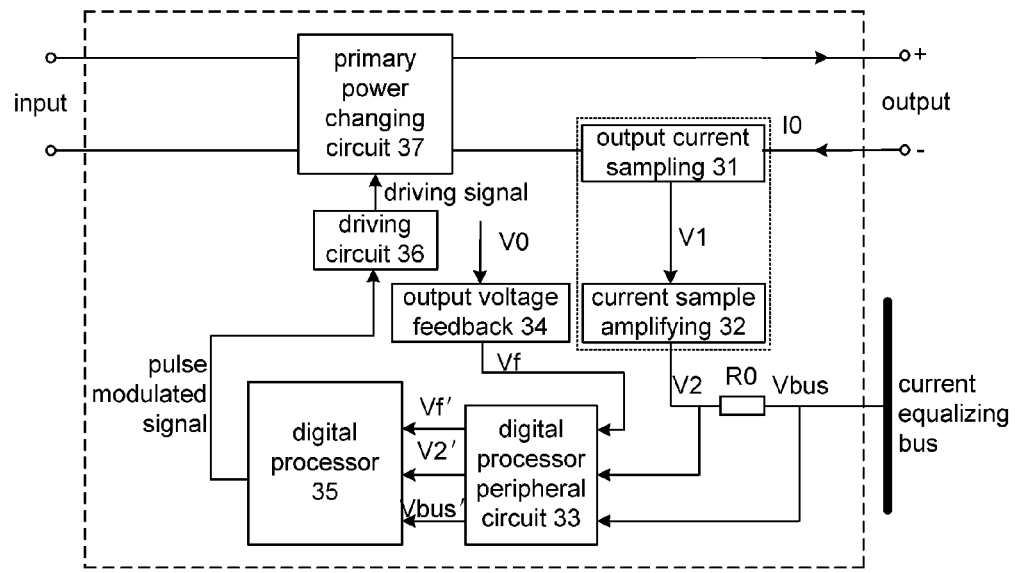
FIG. 16 is a block diagram of a current equalizing circuit without any analog current equalization controller inside a digital power supply according to an embodiment of the disclosure.

FIG. 16 is a block diagram of a current equalizing circuit without any analog current equalization controller inside a digital power supply according to an embodiment of the disclosure. As shown in FIG. 16, in the automatic current equalizer, the current equalizing circuit inside the digital power supply without any analog current equalization controlling circuit may include an output current sampling circuit 31, an output current amplifying circuit 32, an output voltage feedback circuit 34, a digital processor peripheral circuit 33, a digital processor 35, a driving circuit 36, and a primary power changing circuit 37. The output current sampling circuit 31 may be located on an output loop. An output signal of the output current sampling circuit 31 may serve as an input signal of the current sample amplifying circuit 32. An output signal of the current sample amplifying circuit 32 may be connected to a current equalizing bus via a resistor R0. An output voltage feedback signal may be obtained from an actual output voltage via the output voltage feedback circuit 34. The output signal of the current sample amplifying circuit 32, the voltage signal of the current equalizing bus and the output voltage feedback signal may be sent to the digital processor 35 via the digital processor peripheral circuit 33. The digital processor 35 may output a modulating signal by performing sampling and related operation on the three signals. The modulating signal may produce a driving signal via the driving circuit 36. Finally, the driving signal may drive a relevant power device in the primary power changing circuit 37.

Here, in case of digital and analog power supplies inserted in parallel, the voltage Vbus of the current equalizing bus reflects the average of the voltage signal V2 obtained after output currents of power supply modules are processed by the output current sampling circuit and the current sample amplifying circuit; i.e., Vbus reflects the average of currents output by the modules. When currents output by the modules differ from each other, V2 of the modules are not the same; i.e., a V2 differs from Vbus. In an analog power supply, the output of the current equalization controller 13 will adjust the same-phase input terminal of the voltage error amplifier 15 to output a voltage reference. Finally, the output current of a module may be regulated by adjusting the output voltage of the module. In a digital power supply with an analog current equalization controller, the output of the current equalization controller 28 may adjust the output voltage reference in the digital processor 25. Finally, the output current of a module may be regulated by adjusting the output voltage of the module. In a digital power supply without any analog current equalization controller, the output voltage reference may be adjusted by obtaining a difference between V2 and Vbus via digital operation in the digital processor 35. Finally, the output current of a module may be regulated by adjusting the output voltage of the module. When current equalization is achieved in the modules, the output voltage reference of each module is no longer adjusted. The output voltage remains the same, such that current equalization among the modules is maintained.

The embodiment may in general apply to a power supply system of multiple power supplies in parallel, in particular to a power supply system with digital and analog power supplies inserted in parallel. Here, a power supply module may include, but is not limited to, a switching power supply; a power supply system may include, but is not limited to, a communication power supply system.

Furthermore, an output current sampling circuit discussed here may be located at the positive terminal or the negative terminal of the output loop.

A current sampling device in an output current sampling circuit discussed here may include, but is not limited to, a bi-terminal shunt, a quadri-terminal shunt, a current transformer, a current sensor, or the like.

A current equalization controller circuit discussed here may include, but is not limited to, a dedicated analog current equalization controller circuit or an operation amplifier circuit.

The embodiment is easy to implement and may implement current equalization in case both digital and analog power supplies are inserted in one power supply system, enhancing reliability of a power supply module and of the entire power supply system.

Embodiment 2

As shown in FIG. 13, current equalization is performed for the analog power supply 1301 and the digital power supply 1302 in parallel. The digital power supply 1302 may include an analog current equalization controller. A block diagram of a current equalizing circuit in the analog power supply 1301 is as shown in FIG. 14. A block diagram of a current equalizing circuit in the digital power supply 1302 is as shown in FIG. 15.

Vbus may be obtained from a current equalizing bus, which is connected, via a resistor R0, to amplified signals of output currents of the analog power supply 1301 and the digital power supply 1302. Vbus reflects the average of output currents of the analog power supply 1301 and the digital power supply 1302.

As shown in FIG. 14, in an analog power supply, a voltage signal V2 is obtained after an output current 10 passes through an output current sampling circuit 11 and a current sampling amplifying circuit 12. V2 reflects the size of the output current of a local power supple module, and serves as a first input of the current equalization controller 13. Vbus reflects the average of output currents of the two power supplies, and serves as a second input of the current equalization controller 13. V3 is the output of the current equalization controller 13. V3 affects output voltage reference Vr, and further affects a new output voltage reference Vr' obtained via analog circuit operation of V3 and Vr. Vr' serves as a same-phase input of the voltage error amplifier 15 of the voltage error amplifying module terminal. Vr' and the terminal output voltage feedback Vf (an opposite-phase input of the voltage error amplifier 15) again affect the output Ve of the voltage error amplifier 15. Ve alters the driving signal via signal producing and driving unit circuit 16. Finally, an output voltage is adjusted by regulating the working state of the primary power changing circuit 17 to achieve output current equalization. For example, when V2 of a module is less than Vbus, i.e., the output current of the module is less than the average current. The output V3 of the current equalization controller 13 increases. The output voltage reference increases accordingly. Then, the output voltage of the module increases, increasing the output current of the module, thereby achieving current equalization. Vice versa (when V2 is greater than Vbus).

As shown in FIG. 15, in a digital power supply with an analog current equalization controller 28 circuit, a voltage signal V2 is obtained after the output current 10 passes through the output current sampling 21 circuit and the current sample amplifying 22 circuit. V2 reflects the size of the output current of a local power supple module, and serves as a first input of the current equalization controller 28. Vbus reflects the average of output currents of the two power supplies, and serves as a second input of the current equalization controller 28. V3 is the output of the current equalization controller 28. Vf is the output voltage feedback signal obtained after the actual output voltage V0 passes though the output voltage feedback 24 circuit. V3 and Vf pass through the digital processor peripheral circuit 23 to obtain analog signals V3' and Vf' that are ready for A/D conversion and sampling operation by the digital processor 25.

Figure 17:
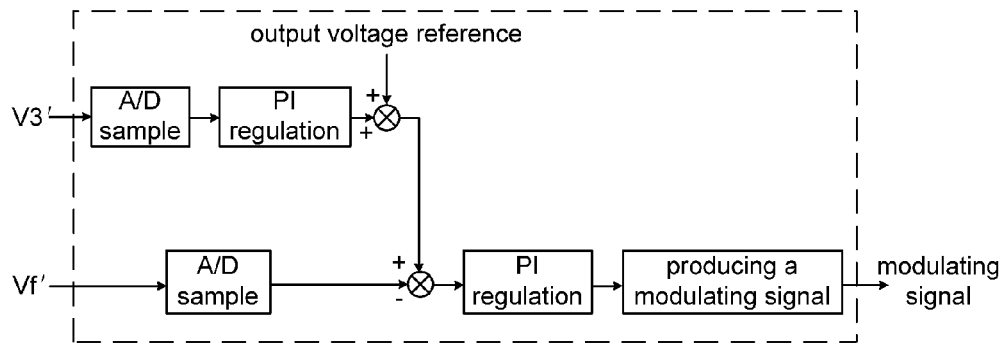
FIG. 17 is a schematic diagram of current equalization control inside a digital processor according to an Embodiment 2 of the disclosure.

FIG. 17 is a schematic diagram of current equalization control inside a digital processor according to Embodiment 2 of the disclosure. Control as shown in FIG. 17 is performed in digital processor 25. The analog signals V3' and Vf' are converted to digital signals via an A/D sample converting channel of the digital processor 25. The digital signal V3' is then biased to obtain the current equalizing loop error. The current equalizing loop output is obtained by PI regulation of the current equalizing loop error. A new output voltage reference is obtained by performing digital operation on the current equalizing loop output and the digital output voltage reference. The voltage loop error is obtained by performing digital operation on the new output voltage reference and the digital signal Vf. The voltage loop output is obtained via PI regulation of the voltage loop error. The modulating signal is produced by processing the voltage loop output. The driving signal is produced after the modulating signal output by the digital processor 25 passes through the driving circuit 26. The driving signal adjusts the output voltage by regulating the working state of the primary power changing circuit 27 to achieve output current equalization. For example, when V2 of a module is less than Vbus, i.e., the output current of the module is less than the average current. The output V3 of the current equalization controller 13 increases. The output voltage reference increases with a positive current equalizing loop output in the digital processor 25. Then, the output voltage of the module increases, increasing the output current of the module, thereby achieving current equalization. And vice versa.

Embodiment 3

As shown in FIG. 13, current equalization is performed for the analog power supply 1301 and the digital power supply 1302 in parallel. The digital power supply 1302 may include no analog current equalization controller. A block diagram of a current equalizing circuit in the analog power supply 1301 is as shown in FIG. 14. A block diagram of a current equalizing circuit in the digital power supply 1302 is as shown in FIG. 16.

Vbus may be obtained from a current equalizing bus, which is connected, via a resistor R0, to amplified signals of output currents of the analog power supply 1301 and the digital power supply 1302. Vbus reflects the average of output currents of the analog power supply 1301 and the digital power supply 1302.

The mechanism of regulating current equalization in an analog power supply is the same as in Embodiment 2, and therefore is not repeated.

As shown in FIG. 16, in a digital power supply without any analog current equalization controller circuit, a voltage signal V2 is obtained after the output current IO passes through the output current sampling 31 circuit and the current sample amplifying 32 circuit. V2 reflects the size of the output current of a local power supple module. The output voltage feedback signal Vf is obtained after the output voltage passes though the output voltage feedback 34 circuit. V2, Vbus and Vf pass through the corresponding digital processor peripheral circuit 33 to obtain analog signals V2', Vbus', and Vf' that are ready for A/D conversion and sampling operation by the digital processor 35.

Figure 18:
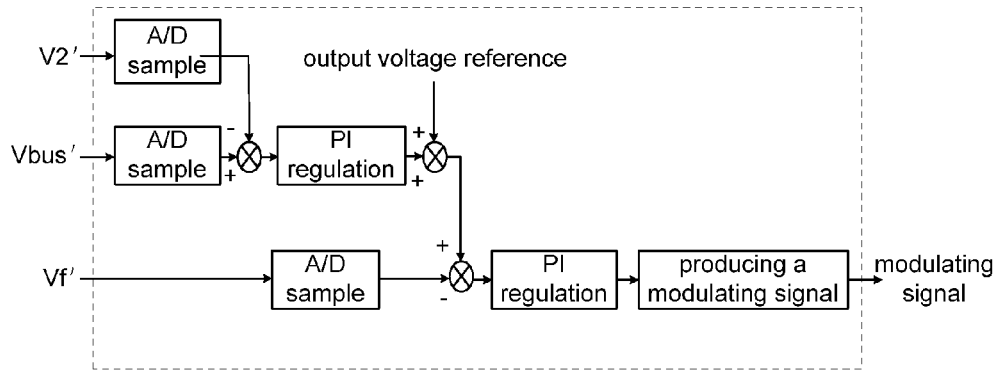
FIG. 18 is a schematic diagram of current equalization control inside a digital processor according to an Embodiment 3 of the disclosure.

FIG. 18 is a schematic diagram of current equalization control inside a digital processor according to Embodiment 3 of the disclosure. Control as shown in FIG. 18 is performed in digital processor 35. The analog signals V2', Vbus', and Vf' are converted to digital signals via an A/D sample converting channel of the digital processor 35. The current equalizing loop error is obtained via digital operation of the digital signals V2' and Vbus'. The current equalizing loop output is obtained by PI regulation of the current equalizing loop error. A new output voltage reference is obtained by performing digital operation on the current equalizing loop output and the digital output voltage reference. The voltage loop error is obtained by performing digital operation on the new output voltage reference and the digital signal Vf'. The voltage loop output is obtained via PI regulation of the voltage loop error. The modulating signal is produced by processing the voltage loop output. The driving signal is produced after the modulating signal output by the digital processor 35 passes through the driving circuit 36. The driving signal adjusts the output voltage by regulating the working state of the primary power changing circuit 37 to achieve output current equalization. For example, when V2 of a module is less than Vbus, i.e., the output current of the module is less than the average current. The current equalizing loop error in the digital processor 35 is positive. The current equalizing loop output after PI regulation is positive, increasing the output voltage reference. Then, the output voltage of the module increases, increasing the output current of the module, thereby achieving current equalization. And vice versa.

Embodiment 2 and Embodiment 3 are described with an example of current equalization of two power supplies. The design of current equalization for N modules in parallel is similar.

It thus may be seen that the solution provided by an aforementioned embodiment is capable of implementing effective current equalization in case both digital and analog power supplies are inserted in one power supply system. The solution is easy to implement, and can enhance reliability of a power supply module and of the entire power supply system.

Clearly, those skilled in the art will know that modules or steps of the disclosure may be realized using a universal computing device, and may be integrated in a single computing device or distributed in a network formed by multiple computing devices. Optionally, they may be realized using computing device executable program codes, and thus may be stored in a storage device and executed by a computing device. In some cases, the steps may be executed in an order different from that illustrated or described here, or may each be made into an Integrated Circuit module. Multiple modules or steps herein may be realized by being made into a single Integrated Circuit module. Thus, an embodiment of the disclosure is not limited to a specific combination of hardware and software.

What described are merely embodiments of the disclosure, and are not for limiting the disclosure. Those skilled in the art may know that there are modifications and variations of the disclosure. Any modification, equivalent replacement, improvement, and the like made within the spirit and principle of the present disclosure should be included in the scope of the present disclosure.

The invention claimed is:

1. A digital current equalizer, comprising an output-current sampling-and-amplifying module, a digital processing module, and a primary power converting module, an input terminal of the output-current sampling-and-amplifying module being connected to an output loop of a power supply, and an output terminal of the output-current sampling-and-amplifying module being connected, via a resistor R0, to a current equalizing bus, wherein the digital processing module is configured for: adjusting, according to a difference between an output voltage signal V2 of the output-current sampling-and-amplifying module and a voltage signal Vbus of the current equalizing bus, an output voltage reference signal Vr; and controlling, according to the adjusted output voltage reference signal Vr', the primary power converting module to perform voltage adjustment, wherein the digital current equalizer further comprises a current equalization controlling module, a first input terminal of the current equalization controlling module being connected to the output voltage signal V2 of the output-current sampling-and-amplifying module, a second input terminal of the current equalization controlling module being connected to the voltage signal Vbus of the current equalizing bus, and an output terminal of the current equalization controlling module being connected to the digital processing module, wherein the current equalization controlling module is configured for outputting a voltage signal V3 representing the difference between the output voltage signal V2 of the output-current sampling-and-amplifying module and the voltage signal Vbus of the current equalizing bus; and the digital processing module is configured for: adjusting, according to the voltage signal V3, the output voltage reference signal Vr; and controlling, according to the adjusted output voltage reference signal Vr', the primary power converting module to perform voltage adjustment, wherein the digital current equalizer further comprises a digital processing peripheral module and an output voltage feedback module, the output of the output voltage feedback module and the output of the current equalization controlling module being connected, via the digital processing peripheral module, to the digital processing module, wherein the output voltage feedback module is configured for obtaining, according to an actual output voltage V0 of the power supply, an output voltage feedback signal Vf;

the digital processing peripheral module is configured for converting the voltage signal V3 and the output voltage feedback signal Vf output by the output voltage feedback module respectively to signals V3' and Vf' prepared for an analog to digital conversion and sampling operation by the digital processing module; and the digital processing module is configured for: adjusting, according to the signal V3' obtained after converting the voltage signal V3 by the digital processing peripheral module, the output voltage reference signal Vr; and controlling, according to the signal Vf' obtained after converting the output voltage feedback signal Vf by the digital processing peripheral module and the adjusted output voltage reference signal Vr', the primary power converting module to perform voltage adjustment.

2. The digital current equalizer according to claim 1, wherein the digital processing module comprises:

a first A/D sample converting channel configured for converting the signals V3' and Vf' obtained after conversion by the digital processing peripheral module respectively to digital signals V3' and Vf';

a biasing module configured for biasing the digital signal V3' to obtain a current equalizing loop error;

a first PI regulation module configured for performing PI regulation on the current equalizing loop error to obtain a current equalizing loop output;

a first digital operation module configured for performing digital operation on digital the output voltage reference signal Vr and the current equalizing loop output to obtain the adjusted output voltage reference signal Vr', the digital operation being weighted addition in case that a backward input terminal of the current equalization controlling module is connected to the output voltage signal V2 of the output-current sampling-and-amplifying module and a forward input terminal of the current equalization controlling module is connected to the voltage signal Vbus of the current equalizing bus, or the digital operation being weighted subtraction with the digital output voltage reference signal Vr as a minuend and the current equalizing loop output as a subtrahend in case that a forward input terminal of the current equalization controlling module is connected to the output voltage signal V2 of the output-current sampling-and-amplifying module and a backward input terminal of the current equalization controlling module is connected to the voltage signal Vbus of the current equalizing bus;

a second digital operation module configured for performing digital operation on the adjusted output voltage reference signal Vr' and the digital signal Vf' obtained after conversion to obtain a voltage loop error, the digital operation being weighted subtraction with the Vr' as a minuend and the digital signal Vf' as a subtrahend;

a second PI regulation module configured for performing PI regulation on the voltage loop error to obtain a voltage loop output; and a first modulating signal producing module configured for producing, according to the voltage loop output, a modulating signal.

3. The digital current equalizer according to claim 1, wherein the current equalization controlling module comprises one of an analog current equalization controller circuit and an operation amplifier circuit.

4. A digital current equalizer, comprising an output-current sampling-and-amplifying module, a digital processing module, and a primary power converting module, an input terminal of the output-current sampling-and-amplifying module being connected to an output loop of a power supply, and an output terminal of the output-current sampling-and-amplifying module being connected, via a resistor R0, to a current equalizing bus, wherein
 the digital processing module is configured for: adjusting, according to a difference between an output voltage signal V2 of the output-current sampling-and-amplifying module and a voltage signal Vbus of the current equalizing bus, an output voltage reference signal Vr; and controlling, according to the adjusted output voltage reference signal Vr', the primary power converting module to perform voltage adjustment,
 wherein the output terminal of the output-current sampling-and-amplifying module and the current equalizing bus are connected to the digital processing module,
 wherein the digital current equalizer further comprises a digital processing peripheral module and an output voltage feedback module, an output terminal of the output voltage feedback module, the output terminal of the output-current sampling-and-amplifying module, and an output terminal of the current equalizing bus being connected, via the digital processing peripheral module, to the digital processing module, wherein the output voltage feedback module is configured for obtaining, according to an actual output voltage V0 of the power supply, an output voltage feedback signal Vf;

the digital processing peripheral module is configured for converting the output voltage signal V2 of the output-current sampling-and-amplifying module, the voltage signal Vbus of the current equalizing bus, and the output voltage feedback signal Vf output by the output voltage feedback module respectively to signals V2', Vbus', and Vf' prepared for an analog to digital conversion and sampling operation by the digital processing module; and the digital processing module is configured for: adjusting, according to the signal V2' obtained after converting the output voltage signal V2 by the digital processing peripheral module and the signal Vbus' obtained after converting the voltage signal Vbus by the digital processing peripheral module, the output voltage reference signal Vr; and controlling, according to the signal Vf' obtained after converting the output voltage feedback signal Vf by the digital processing peripheral module and the adjusted output voltage reference signal Vr', the primary power converting module to perform voltage adjustment.

5. The digital current equalizer according to claim 4, wherein the digital processing module comprises:
 a second A/D sample converting channel configured for converting the signals V2', Vbus', and Vf' obtained after conversion by the digital processing peripheral module respectively to digital signals V2', Vbus', and Vf';
 a third digital operation module configured for performing digital operation on the digital signals V2' and Vbus' to obtain a current equalizing loop error, the digital operation being weighted subtraction with the digital signal V2' as a minuend and the digital signal Vbus' as a subtrahend, or with the digital signal Vbus' as a minuend and the digital signal V2' as a subtrahend;
 a third PI regulation module configured for performing PI regulation on the current equalizing loop error to obtain a current equalizing loop output;
 a fourth digital operation module configured for performing digital operation on the current equalizing loop output and the digital output voltage reference signal Vr to obtain the adjusted output voltage reference signal Vr', the digital operation being weighted subtraction with the digital output voltage reference signal Vr as a minuend and the current equalizing loop output as a subtrahend in case that the digital signal V2' serves as the minuend and the digital signal Vbus' serves as the subtrahend, or the digital operation being weighted addition in case that the digital signal Vbus' serves as the minuend and the digital signal V2' serves as the subtrahend;
 a fifth digital operation module configured for performing digital operation on the adjusted output voltage reference signal Vr' and the digital signal Vf' obtained after conversion to obtain a voltage loop error, the digital operation being weighted subtraction with the Vr' as a minuend and the digital signal Vf' as a subtrahend;
 a fourth PI regulation module configured for performing PI regulation on the voltage loop error to obtain a voltage loop output; and
 a second modulating signal producing module configured for producing, according to the voltage loop output, a modulating signal.

6. The digital current equalizer according to claim 1, further comprising a driving module configured for producing, under the control of the digital processing module, a driving signal, wherein the primary power converting module is configured for performing voltage adjustment according to the driving signal.

7. The digital current equalizer according to claim 1, wherein the output-current sampling-and-amplifying module comprises an output current sampling module and a current sample amplifying module, the output current sampling module being connected to a positive terminal or a negative terminal of the output loop, an output signal of the output current sampling module serving as an input signal of the current sample amplifying module, and an output terminal of the current sample amplifying module being connected, via the resistor R0, to the current equalizing bus.

8. A current equalizing system, comprising one or more analog power supplies and one or more digital power supplies, outputs of the one or more analog power supplies and the one or more digital power supplies being connected in parallel, current equalizing buses of the one or more analog power supplies and the one or more digital power supplies being connected to each other, the one or more digital power supplies comprising a digital current equalizer according to claim 1, and the one or more analog power supplies comprising an analog current equalizer comprising an output-current sampling-and-amplifying module, a current equalization controlling module, an adjusting module, a voltage error amplifying module, and a primary power converting module, wherein an input terminal of the output-current sampling-and-amplifying module is connected to an output loop of an analog power supply, and an output terminal of the output-current sampling-and-amplifying module is connected, via a resistor R0, to a current equalizing bus;

a first input terminal of the current equalization controlling module is connected to an output voltage signal V2 of the output-current sampling-and-amplifying module, a second input terminal of the current equalization controlling module is connected to a voltage signal Vbus of the current equalizing bus, and the current equalization controlling module is configured for outputting a voltage signal V3 representing a difference between the output voltage signal V2 of the output-current sampling-and-amplifying module and the voltage signal Vbus of the current equalizing bus;

the adjusting module is configured for adjusting, according to the voltage signal V3, an output voltage reference signal Vr;

an opposite-phase input terminal of the voltage error amplifying module is connected to the output voltage feedback signal Vf, a same-phase input terminal of the voltage error amplifying module is connected to an adjusted output voltage reference signal Vr' output by the adjusting module, and the voltage error amplifying module is configured for controlling, according to the adjusted output voltage reference signal Vr' and the output voltage feedback signal Vf, the primary power converting module to perform voltage adjustment.

9. A current equalizing method, comprising:

adjusting, according to a difference between an output voltage signal V2 of an output-current sampling-and-amplifying module and a voltage signal Vbus of a current equalizing bus, an output voltage reference signal Vr, wherein an input terminal of the output-current sampling-and-amplifying module is connected to an output loop of a power supply, and an output terminal of the output-current sampling-and-amplifying module is connected, via a resistor R0, to the current equalizing bus; and performing voltage adjustment on the power supply according to the adjusted output voltage reference signal Vr', a first input terminal of a current equalization controlling module is connected to the output voltage signal V2 of the output-current sampling-and-amplifying module, a second input terminal of the current equalization controlling module is connected to the voltage signal Vbus of the current equalizing bus, and an output terminal of the current equalization controlling module is connected to a digital processing module, wherein the adjusting, according to a difference between an output voltage signal V2 of an output-current sampling-and-amplifying module and a voltage signal Vbus of a current equalizing bus, an output voltage reference signal Vr comprises:

outputting, by the current equalization controlling module, a voltage signal V3 representing the difference between the output voltage signal V2 of the output-current sampling-and-amplifying module and the voltage signal Vbus of the current equalizing bus; and adjusting, by the digital processing module according to the voltage signal V3, the output voltage reference signal Vr, wherein an output of an output voltage feedback module and the output of the current equalization controlling module are connected, via a digital processing peripheral module, to the digital processing module, wherein the method further comprises:

obtaining, by the output voltage feedback module according to an actual output voltage V0 of the power supply, an output voltage feedback signal Vf;

converting, by the digital processing peripheral module, the voltage signal V3 and the output voltage feedback signal Vf output by the output voltage feedback module respectively to signals V3' and Vf' prepared for an analog to digital conversion and sampling operation by the digital processing module, wherein the adjusting, by the digital processing module according to the voltage signal V3, the output voltage reference signal Vr comprises:

adjusting, by the digital processing module according to the signal V3', the output voltage reference signal Vr, wherein the performing voltage adjustment on the power supply according to the adjusted output voltage reference signal Vr' comprises:

performing voltage adjustment on the power supply according to the signal Vf' and the adjusted output voltage reference signal Vr'.

10. The digital current equalizer according to claim 3, wherein the output-current sampling-and-amplifying module comprises an output current sampling module and a current sample amplifying module, the output current sampling module being connected to a positive terminal or a negative terminal of the output loop, an output signal of the output current sampling module serving as an input signal of the current sample amplifying module, and an output terminal of the current sample amplifying module being connected, via the resistor R0, to the current equalizing bus.

11. The digital current equalizer according to claim 4, wherein the output-current sampling-and-amplifying module comprises an output current sampling module and a current sample amplifying module, the output current sampling module being connected to a positive terminal or a negative terminal of the output loop, an output signal of the output current sampling module serving as an input signal of the current sample amplifying module, and an output terminal of the current sample amplifying module being connected, via the resistor R0, to the current equalizing bus.

* * * * *